United States Patent
De Greve et al.

(10) Patent No.: US 8,402,733 B2
(45) Date of Patent: *Mar. 26, 2013

(54) MULTIBUNDLE YARN WITH REDUCED TORSIONS

(75) Inventors: Kris De Greve, Roeselare (BE); Xavier Amils, Zwevegem (BE); Steve Verstraeten, Antwerp (BE); Pol Speleers, Waregem (BE)

(73) Assignee: NV Bekaert SA, Zwevegem (BE)

( * ) Notice: Subject to any disclaimer, the term of this patent is extended or adjusted under 35 U.S.C. 154(b) by 0 days.

This patent is subject to a terminal disclaimer.

(21) Appl. No.: 12/995,818

(22) PCT Filed: May 29, 2009

(86) PCT No.: PCT/EP2009/056674
§ 371 (c)(1),
(2), (4) Date: Dec. 2, 2010

(87) PCT Pub. No.: WO2009/147114
PCT Pub. Date: Dec. 10, 2009

(65) Prior Publication Data
US 2011/0072776 A1    Mar. 31, 2011

(30) Foreign Application Priority Data

Jun. 6, 2008 (EP) .................................... 08157727
Jun. 6, 2008 (EP) .................................... 08157728

(51) Int. Cl.
*D02G 3/02* (2006.01)

(52) U.S. Cl. .............................. 57/236; 57/237; 57/243
(58) Field of Classification Search ............. 57/243, 57/236, 237; 219/202, 553
See application file for complete search history.

(56) References Cited

U.S. PATENT DOCUMENTS 2,050,298 A    8/1936    Everett
2,977,748 A    4/1961    Zisman et al.
(Continued)

FOREIGN PATENT DOCUMENTS

EP    0243504 (A1)    11/1987
EP    1362941 (A1)    11/2003
(Continued)

OTHER PUBLICATIONS

U.S. Appl. No. 12/995,840, filed Dec. 2, 2010, Kris De Greve et al.
(Continued)

*Primary Examiner* — Shaun R Hurley
(74) *Attorney, Agent, or Firm* — Foley & Lardner LLP

(57) ABSTRACT

A yarn (100) comprising two or more bundles (110, 120, 130), each of said bundles comprising at least thirty metal fibres (140) is described. The bundles of the yarn are twisted with one another with a predetermined number of torsions per meter, said predetermined number of torsions permeter is smaller than 80 per meter and larger than 10 per meter. By doing so, an improved flexlife of the yarn can be obtained.

16 Claims, 2 Drawing Sheets

U.S. PATENT DOCUMENTS

Figure 1:
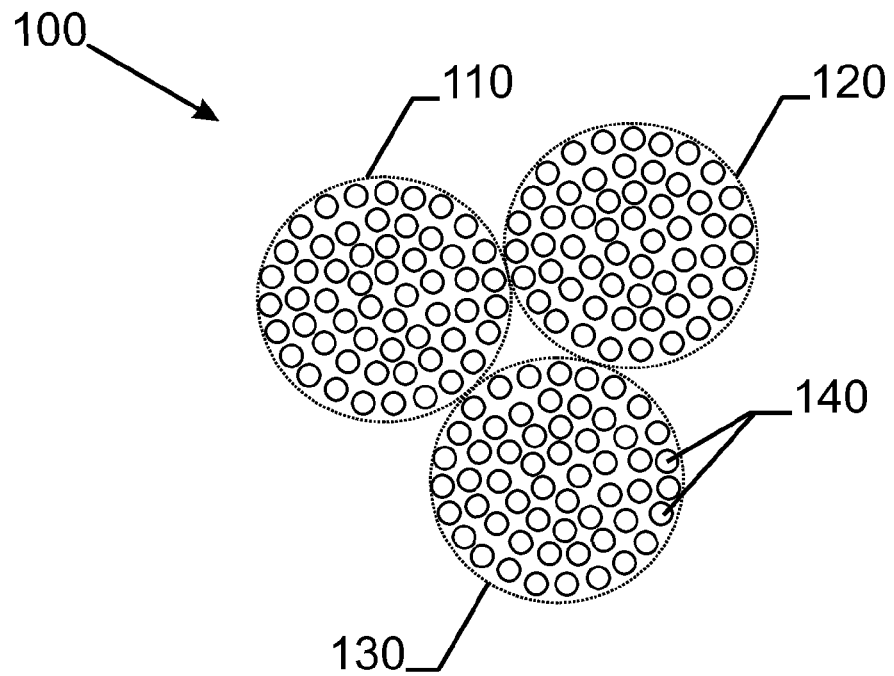

| | | | |
|---|---|---|---|
| 3,277,564 | A | 10/1966 | Webber et al. |
| 3,379,000 | A | 4/1968 | Webber et al. |
| 3,394,213 | A | 7/1968 | Roberts et al. |
| 3,807,026 | A | 4/1974 | Takeo et al. |
| 4,429,216 | A | 1/1984 | Brigham |
| 4,983,814 | A | 1/1991 | Ohgushi et al. |
| 5,239,002 | A | 8/1993 | Ahmed et al. |
| 5,287,690 | A * | 2/1994 | Toon ................. 57/210 |
| 6,310,286 | B1 | 10/2001 | Troxel et al. |
| 6,957,525 | B2 * | 10/2005 | Verstraeten et al. ............ 57/238 |
| 7,205,510 | B2 | 4/2007 | Howick |
| 7,291,391 | B2 * | 11/2007 | Watson et al. ................ 428/389 |
| 2003/0209003 | A1 * | 11/2003 | Verstraeten et al. ............ 57/212 |
| 2004/0147193 | A1 | 7/2004 | De Waegheneire |
| 2011/0114619 | A1 * | 5/2011 | Amils et al. ................. 219/202 |
| 2011/0225945 | A1 * | 9/2011 | Le Percq et al. ................. 57/243 |
| 2011/0225946 | A1 * | 9/2011 | Le Percq et al. ................. 57/243 |
| 2011/0240626 | A1 * | 10/2011 | Mullebrouck et al. ........ 219/260 |

FOREIGN PATENT DOCUMENTS

| | | |
|---|---|---|
| EP | 1722017 (A1) | 11/2006 |
| JP | 5-177243 (A) | 7/1993 |
| WO | WO 2006/120045 (A1) | 11/2006 |

OTHER PUBLICATIONS

USPTO Office Action, U.S. Appl. No. 13/003,813, Oct. 26, 2012, 14 pages.

USPTO Office Action, U.S. Appl. No. 12/995,840, Jan. 29, 2013, 20 pages.

* cited by examiner

MULTIBUNDLE YARN WITH REDUCED TORSIONS

TECHNICAL FIELD

The present invention relates to a yarn comprising two or more bundles of metal fibres and to its various uses.

BACKGROUND ART

Yarns comprising two or more bundles of metal fibres are known. Such yarns are e.g. applied in vehicle seat heating systems or heatable textiles. In these applications, the yarns are used as an electrical resistance and provided with an electric current to obtain the required heating effect. Other applications of such yarns include the use as anti-static brushes, the use as leadwire for electrodes or as an electrical conductor for power and or signals.

In many of these applications, the yarns are subjected to different stress and/or strain conditions. In particular, the yarns may be repeatedly loaded under tensile and/or bending or torsion stresses. When repeatedly subjected to such stresses, metal fibers in the yarn may break, eventually resulting in the failure of the yarn.

DISCLOSURE OF INVENTION

In general, there is a desire to increase the life time of systems or components. In case of the application of yarns comprising bundles of metal fibres, the life time of the yarn is, amongst other, affected by its resistance against repeated bending, which is generally called the flexlife. Therefore, in order to improve the life time of yarns comprising bundles of metal fibres, it is an object of the present invention to design a yarn having an improved resistance against bending and/or fretting and/or wear, which improved resistance is called an improved flexlife. Within the meaning of the present invention, flexlife is to be understood as "the resistance to rupture of the yarn under repetitive bending conditions". Examples of applications wherein the flexlife of the yarns plays an important role are e.g. the use in anti-static brushes or the use as leadwire for electrodes or the use in car seat heating.

According to the invention, this object is achieved by a yarn comprising two or more bundles, each of said bundles comprising at least thirty metal fibres, said bundles being twisted with one another with a predetermined number of torsions per meter, characterized in that said predetermined number of torsions per meter is smaller than 80 per meter and larger than 10 per meter, e.g. from 20 per meter until 70 per meter, e.g. from 30 per meter until 60 per meter. As used herein, the term "number of torsions" must be understood to be the amount of twist or torsion used to obtain the electrically conductive yarn, or stated otherwise, the number of turns about the axis of the yarn. Or in other words, the number of torsions is the amount of twist used to combine the bundles into the yarn. In a preferred embodiment, the bundles in the yarn are untwisted before being combined into a yarn. In an alternative preferred embodiment, the bundles in the yarn are twisted before being combined into a yarn.

It has been observed in various experiments that the number of torsions per meter as applied in a yarn comprising two or more bundles of metal fibres affects the flexlife of the yarn. More specifically, it has been observed that an important increase in flexlife is achieved when the number of torsions per meter is kept below 80. In general, a much higher number of torsions per meter is applied in yarn comprising metal fibers in multiple bundles, in order to keep the different bundles of the yarn together. However, as surprisingly has been observed in the present invention, this adversely affects the flexlife of such yarn. As a consequence, the life expectancy of the application comprising the yarn is reduced. By selecting the number of torsions per meter according to the present invention, an increase of the flexlife of the yarns, and consequently an increased life time of the system wherein the yarns are applied, can be realised. The fibres as applied in yarns according to the present invention can be single-drawn or bundle-drawn metal fibers.

In order to keep the different bundles of the yarn from spreading too far apart, it has been observed that a minimum number of approx. 10 torsions per meter is sufficient.

As a matter of example only, it has been observed by experiments that in particular embodiments of the yarns according to the present invention the flexlife can be 10.000 cycles or more.

In a preferred embodiment of the present invention, the metal fibers in the yarn are obtained by a bundle-drawing process. Such a process is generally known and involves the coating of a plurality of metal wires (a bundle), enclosing the bundle with a cover material, drawing the bundle to the appropriate diameter and removing the cover material of the individual wires (fibres) and the bundle, as e.g. described in U.S. Pat. Nos. 3,379,000, 3,394,213, 2,050,298 or 3,277,564. Compared to grouping a plurality of single-drawn fibres together to form a bundle, the bundle-drawn process allows the fibre diameter to be reduced further simultaneously. It has been observed that a reduced fibre diameter also has a positive effect on the flexlife. Therefore, in a preferred embodiment, the equivalent diameter of the metal fibers is smaller than 20 µm. The term "equivalent diameter" of a fiber is to be understood as the diameter of an imaginary circle having a surface area equal to the surface area of the radial cross section of the fiber. In case of the bundle drawing operation, the cross section of a fiber has usually a pentagonal or hexagonal shape as is shown in FIG. 2 of U.S. Pat. No. 2,050,298, and the circumference of the fiber cross section is usually serrated as opposed to a single drawn fiber, which has a circular cross section.

The metal fiber yarn can further be coated with a suitable coating, preferably PVC, PVA, PTFE (polytetrafluoroethylene, also called Teflon) FEP (copolymers of tetrafluoromethylene and hexafluoropropylene), MFA (perfluoroalkoxy polymer) or polyurethane lacquer.

A yarn according to the invention can be used in a heating element, as a sewing wire or as a lead wire.

BRIEF DESCRIPTION OF FIGURES IN THE DRAWINGS

Figure 2A:
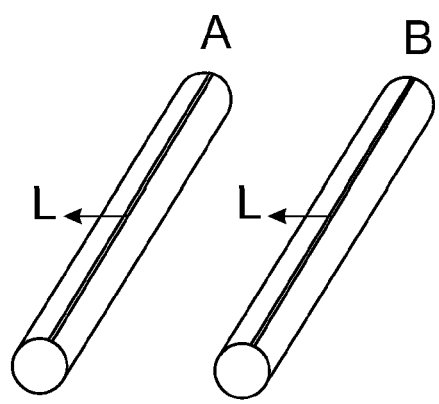
Figure 2B:
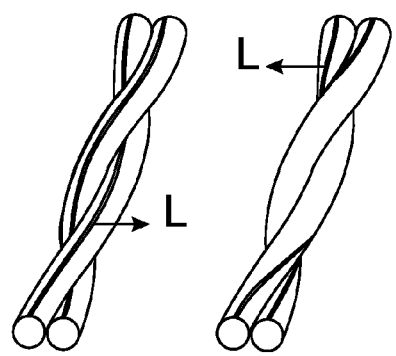
Figure 3:
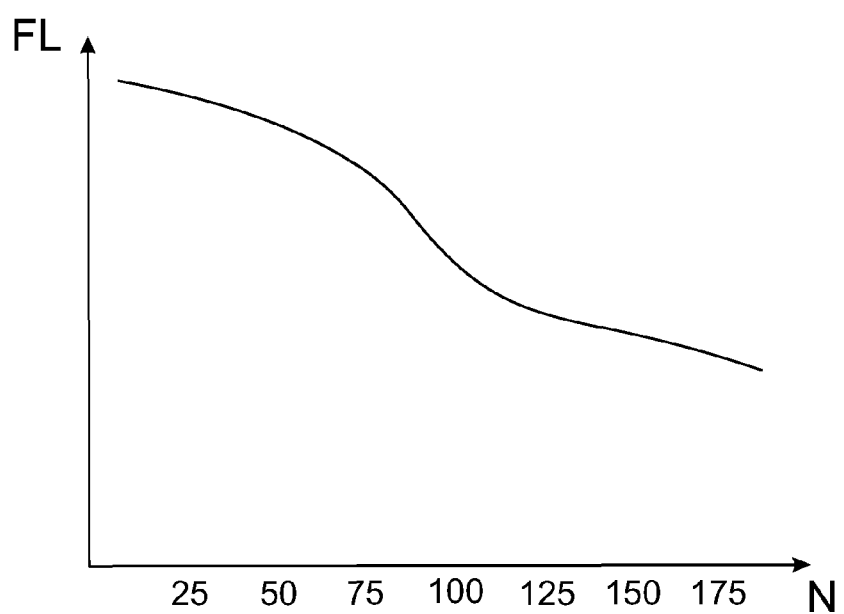

FIG. 1 schematically shows a cross-sectional view of a yarn according to the present invention;

FIGS. 2a and 2b schematically illustrate two possible ways of twisting multiple bundles about one another to obtain a yarn according to the present invention;

FIG. 3 schematically illustrates the flexlife of a yarn as a function of the number of torsions per meter.

MODE(S) FOR CARRYING OUT THE INVENTION

Yarns according to the present invention comprise two or more bundles of metal fibres, each bundle comprising at least 30 metal fibres. FIG. 1 schematically depicts a cross-sectional view of a yarn 100 according to the present invention. The yarn 100 comprises three bundles 110, 120 and 130 each comprising more than 30 continuous metal fibres 140.

In the present invention, metal is to be understood as encompassing both metals and metal alloys (such as stainless steel) or compositions comprising both metal and non metallic components (such as carbon steel). In a preferred embodiment, the metal fibres are made of stainless steel as they provide an improved resistance to corrosion and oxidation. Said stainless steel fibres are preferable provided out of AISI 300 series such as AISI 302, 304, 316 or 316L, or AISI 400 series such as AISI 430, AISI 625 or AISI 904.

In another preferred embodiment, at least part of the metal fibers in said metal fiber bundles have a cross section comprising at least two concentric metal layers. Even more preferably, said fibers comprise a copper core and a stainless steel mantle, such as described in JP05-177243. Such fibres provide improved electrical properties combined with the corrosion and oxidation resistance of stainless steel. In a preferred embodiment, the stainless steel mantle may comprise AISI 316L steel or AISI 625 or AISI 904. In an alternative more preferable embodiment the metal fibers comprise three concentric metal layers as e.g. in JP-A-5-177243 and WO-A-2006/120045 describing metal fibres with multiple layers and a process for obtaining such metal fibers. In another preferred embodiment, the yarns in the present invention comprise metal fibers which with a core of stainless steel and a copper containing mantle, such as e.g. described in EP1362941.

In accordance with the present invention, the fibres forming the bundles may either be single drawn filament fibres or may be bundle-drawn fibres.

The metal fibres as applied in the yarns according to the present invention preferably have an equivalent diameter being less than 50 micrometer, but more than 0.5 micrometer, preferably between 1 micrometer and 35 micrometer, yet preferably between 7 and 32 micrometer.

Preferably, the metal fibres are present as filament fibres. In an alternative preferred embodiment the metal fibers are present as staple fibres.

The yarns according to the present invention may advantageously be applied to obtain a textile product, e.g. a braided, woven, knotted or knitted textile product.

When said yarns are applied to obtain a knitted structure, said structure may e.g. be applied for car glass separation material.

Yarns according to the present invention can equally be applied as braids, e.g. as shielding materials around flexible hoses.

When such materials are to be used for forming the metal fibres, bundles of such materials may equally be obtained by grouping a plurality of single-drawn wires or filaments, or, preferably, using a bundle-drawing process.

Said yarns according to the present invention may advantageously be applied for such applications where the electrical conductivity is important, such as electrical heating applications. Such applications can e.g. include heatable textiles wherein the electrically conductive yarn functions as a resistive heating element. Such textiles can e.g. be part of a heating device which is integrated in a car seat, usually between a foamed part of the seat and the seat upholstery.

A further application where the electrical conductivity is important and where the yarns according to the invention may advantageously be applied is the use as leadwire connecting different electronic devices to each other such as batteries, PCB's or monitoring devices.

With respect to the twisting of the two or more bundles as applied in the yarns according to the present invention, two different options exist. These two options are illustrated in FIGS. 2a and 2b.

FIG. 2a schematically depicts two bundles A and B and a reference line L on the outer surface of each bundle (if the bundle is untwisted, then the reference point is a fibre L the fibre being located on the circumference of the bundle).

One way of twisting the different bundles A and B is by bending the bundles about each other, substantially without applying any torsion on the individual bundles. As such, the twisting of the two or more bundles does not result in a (additional) torsion of the individual bundles. This is illustrated on the left side of FIG. 2b. As can be seen, reference line L (or fibre L) substantially remains in the position relative to circumference (or the other fibres) of the bundle. This process is sometimes referred to as "cabling" and can be carried out by means of tubular twisting machines.

As an alternative, the bundles of the yarns can be twisted by applying a torsional force on the two or more bundles in addition to the bending force. By doing so, the individual bundles are also twisted on their own. This is illustrated on the right side of FIG. 2b. This second way of twisting can be carried out by means of a double-twisting machine, sometimes referred to as a buncher.

The improvement with respect to the flexlife that can be realised by yarns according to the invention is illustrated by the following test results.

The following table 1 shows, as an example, the experimentally determined flexlife of the following yarns, the tested yarns are yarns with a core of copper and stainless steel mantle as described in JP-A-5-177243.

The yarns are indicated as:
a/b×c/d
wherein
a equals the equivalent diameter of the fibres,
b represents the number of bundles,
c represents the number of fibres per bundle and
d represents the number of torsions per meter.

TABLE 1

| yarn | Av. # of cycles (Flexlife) | Tex | Flex Factor |
| --- | --- | --- | --- |
| 14/4 × 90/40 | 3593 | 445 | 8.1 |
| 14/4 × 90/100 | 2526 | 445 | 5.7 |
| 14/4 × 90/150 | 1989 | 445 | 4.5 |
| 12/2 × 275/50 | 4800 | 499 | 9.6 |
| 12/2 × 275/120 | 3627 | 499 | 7.3 |
| 12/2 × 275/175 | 3089 | 499 | 6.2 |
| 12/3 × 275/50 | 6446 | 749 | 8.6 |
| 12/3 × 275/120 | 5727 | 749 | 7.6 |
| 12/3 × 275/175 | 5082 | 749 | 6.8 |
| 14/3 × 275/50 | 6871 | 1020 | 6.7 |
| 14/3 × 275/100 | 4784 | 1020 | 4.7 |
| 14/3 × 275/175 | 4013 | 1020 | 3.9 |

The flexlife can be determined by subjecting a sample length of a yarn to a repeated bending under an axial load. The bending degree in such a test is generally taken as 180°. During the test, a micro-current is arranged to run through the yarn sample, the yarn sample forming part of an electrical circuit. Once all fibres of the sample are broken, the electric circuit is also broken and the counting of the number of bendings is stopped.

Flexlife must be compared for yarns having a same tex number (tex is being expressed in g/1000 m). In table 1, it is clear that for yarns with approximately same tex numbers the flexlife is better for smaller diameters of fibers. The flexfactor, which is the ratio of the number of flex life cycles to the Tex of the yarn, is therefore an appropriate means for comparing the "flexlife" of a yarn. By examining the flexfactor, as in table 1, it is clear that lower torsions applied on a yarn, as well as smaller diameters of fibers in the yarn provide a better "flexlife".

The flexlife improvement that can be obtained by yarns according to the present invention is further illustrated by the graph shown in FIG. 3. FIG. 3 schematically indicates the flexlife FL as a function of the number of torsions per meter N. As can be seen on the graph, an important flexlife improvement is obtained when the number of torsions per meter is kept below 80. By a further reduction of the number of torsions per meter, the flexlife can be reduced even further. However, as already mentioned above, in order to keep the different bundles of the yarn from spreading too far apart, it has been observed that a minimum number of approx. 10 torsions per meter should be observed. A good compromise between an improved flexlife and avoiding the bundles from spreading too far apart is found when the number of torsions per meter is between 30 and 60.

Although various specific applications of the yarns according to the invention are mentioned, the present invention is in no way restricted to the applications mentioned.

The invention claimed is:

1. A yarn comprising:
   two or more bundles, each of said bundles comprising at least thirty metal fibres, said bundles being twisted with one another with a predetermined number of torsions per meter,
   wherein said metal fibres are single-drawn or bundle-drawn fibres, and
   wherein said predetermined number of torsions per meter is smaller than 80 per meter and larger than 10 per meter.

2. A yarn according to claim 1, wherein said predetermined number of torsions is between 30 torsions per meter and 60 torsions per meter.

3. A yarn according to claim 1, wherein an equivalent diameter of the metal fibres is between 7 and 32 micrometers.

4. A yarn according to claim 1, wherein the number of fibres per bundle is smaller than 300.

5. A yarn according to claim 1, wherein the number of bundles times the number of fibres per bundle is larger than 60.

6. A yarn according to claim 1, wherein said metal fibres are stainless steel fibres.

7. A yarn according to claim 1, wherein at least some of the metal fibres in said metal fibre bundles have a cross section comprising at least two concentric metal layers.

8. A yarn according to claim 7, wherein a core of said fibres is copper and an outer layer of said at least some of the fibres is stainless steel.

9. A yarn according to claim 7, wherein a core of said fibres is stainless steel and an outer layer of said at least some of the fibres is copper.

10. A yarn according to claim 1, wherein said yarn comprises an isolating coating.

11. A yarn according to claim 1, said yarn additionally comprising a polymer elongated element, said polymer elongated element being twisted with said two or more bundles of metal fibres.

12. A method comprising using the yarn as in claim 1 as a resistive heating element in a heatable textile application.

13. A method comprising using the yarn as in claim 1 as a leadwire.

14. A method comprising using the yarn as in claim 1 as a sewing yarn.

15. A yarn according to claim 5, wherein the number of bundles times the number of fibres per bundle is larger than 250.

16. A yarn according to claim 10, wherein said isolating coating is a polytetrafluoroethylene coating.

* * * * *